(12) United States Patent
Lim et al.

(10) Patent No.: US 6,508,950 B1
(45) Date of Patent: Jan. 21, 2003

(54) REFRIGERANT MIXTURES CONTAINING DIFLUOROMETHANE (HFC-32), PENTAFLUOROETHANE (HFC-125) AND 1,1,1,2-TETRAFLUOROETHANE (HFC-134A)

(75) Inventors: Jong-Sung Lim, Seoul (KR); Byung-Gwon Lee, Seoul (KR); Jae-Duck Kim, Seoul (KR); Sang-Deuk Lee, Seoul (KR); Hoon-Sik Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 125 days.

(21) Appl. No.: 09/692,189

(22) Filed: Oct. 20, 2000

(30) Foreign Application Priority Data

Nov. 2, 1999 (KR) .............................. 99-48069

(51) Int. Cl.$^7$ ................................. C09K 5/04
(52) U.S. Cl. ..................................... 252/67
(58) Field of Search ............................ 252/67

(56) References Cited

U.S. PATENT DOCUMENTS

| | | | |
|---|---|---|---|
| 5,185,094 A | | 2/1993 | Shiflett |
| 5,370,811 A | | 12/1994 | Yoshida et al. |
| 5,643,492 A | | 7/1997 | Shiflett |
| 5,672,293 A | * | 9/1997 | Minor et al. ............... 252/67 |
| 5,736,062 A | * | 4/1998 | Basile et al. ............... 252/67 |
| 5,785,883 A | * | 7/1998 | Minor et al. ............... 252/67 |

FOREIGN PATENT DOCUMENTS

| | | |
|---|---|---|
| JP | 3-170585 | 7/1991 |
| JP | 3-170590 | 7/1991 |
| JP | 3-170594 | 7/1991 |

\* cited by examiner

*Primary Examiner*—John Hardee
(74) *Attorney, Agent, or Firm*—Oblon, Spivak, McClelland, Maier & Neustadt, P.C.

(57) ABSTRACT

The present invention relates to novel refrigerant mixtures as a substitute for chlorodifluoromethane ($CHClF_2$, HCFC-22). More specifically, the invention is directed to refrigerant mixtures that comprise:

difluoromethane ($CH_2F_2$, HFC-32) as the first component;
pentafluoroethane ($CHF_2CF_3$, HFC-125) as the second component;
1,1,1,2-tetrafluoroethane ($CH_2FCF_3$, HFC-134a) as the third component;
any one of cyclopropane ($C_3H_6$, RC-270), 1,1-difluoroethane ($CH_3CHF_2$, HFC-152a), 1,1,1,2,3,3,3-heptafluoropropane ($CF_3CHFCF_3$, HFC-227ea), 1,1,1,2,2-pentafluoropropane ($CH_3CF_2CF_3$, HFC-245cb), octafluorocyclobutane ($C_4F_8$, RC-318), 1,1,1,2,3,3-hexafluoropropane ($CHF_2CHFCF_3$, HFC-236ea), bis(difluoromethyl)ether ($CHF_2OCHF_2$, HFE-134), pentafluoroethylmethylether ($CF_3CF_2OCH_3$, HFE-245), n-pentane ($C_5H_{12}$, R-601) and isopentane (($CH_3)_2CHCH_2CH_3$, R-601a) as the fourth component. The refrigerant mixtures of the invention have working effects equal to that of HCFC-22 but does not have the risk of causing destruction to the ozone layer and can therefore be used as alternative refrigerants to HCFC-22.

10 Claims, No Drawings

REFRIGERANT MIXTURES CONTAINING DIFLUOROMETHANE (HFC-32), PENTAFLUOROETHANE (HFC-125) AND 1,1,1,2-TETRAFLUOROETHANE (HFC-134A)

BACKGROUND OF THE INVENTION

1. Field of the Invention

The present invention relates to novel refrigerant mixtures as a substitute for chlorodifluoromethane ($CHClF_2$, hereinafter referred to HCFC-22).

Specifically, the present invention is directed to refrigerant mixtures wherein any one of the compounds RC-270, HFC-152a, HFC-227ea, BFC-245cb, RC-318, HFC-236ea, HFE-134, HFE-245, R-601 and R-601a is additionally mixed with HFC-32, HFC-125 and HFC-134a.

2. Description of the Prior Art

As is generally well known, CFC compounds have been shown to be a major factor in the destruction of the ozone layer. Accordingly, its production and use are restricted under the Montreal Protocol, and advanced countries have prohibited its use since 1996.

HCFC based compounds, including HCFC-22, that have been used as substitutes for CFC compounds have been a significant factor in the destruction of the ozone layer though it does not cause the destruction as severely as CFC compounds. Accordingly, United Nations announced the suggestion to require reducing 50% of HCFC production all over the world by 1998 through United Nations Environment Program (UNEP) on September, 1987. This proposal was ratified on Jan. 1, 1989 and effectuated on Jul. 1, 1989. On Nov. 15, 1990, U.S. Clean Air Act was amended to restrict the production of HCFC (for example HCFC-22) and its use as a refrigerant since Jan. 1, 2015 and the use of HCFC will be gradually reduced until the use is prohibited around 2020.

Therefore, the results of many studies on alternative refrigerant materials have been published in many countries to overcome restrictions on HCFC-22 refrigerants. Examples of alternative refrigerant mixtures include HFC-407C and HFC-410A, which are recommended by ASHRAE (American Society of Heating, Refrigerating and Air-Conditioning Engineers). HFC-407C is a refrigerant mixture comprising HFC-32/125/134a (mixture weight ratio: 23:25:52) and HFC-410A is a refrigerant mixture comprising HFC-32/125 (mixture weight ratio: 50:50)

Furthermore, U.S. Pat. No. 5,080,823 discloses a mixture refrigerant composition comprising HFC-143a/propane, U.S. Pat. No. 5,185,094 discloses a mixture refrigerant composition comprising HFC-32/125/134a, U.S. Pat. No. 5,211,867 discloses a mixture refrigerant composition comprising HFC-125/143a, U.S. Pat. No. 5,234,613 discloses a mixture refrigerant composition comprising HFC-32/propane, U.S. Pat. No. 5,236,611 discloses a mixture refrigerant composition comprising PFC-218/HFC-143a, U.S. Pat. No. 5,290,466 discloses a mixture refrigerant composition comprising HFC-32/134a/134, U.S. Pat. No. 5,340,490 discloses a mixture refrigerant composition comprising HFC-23/$CO_2$ and HFC-23/116/$CO_2$, U.S. Pat. No. 5,403,504 discloses a mixture refrigerant composition comprising HFC-125/32, U.S. Pat. No. 5,429,740 discloses a mixture refrigerant composition comprising HFC-23/134a, U.S. Pat. No. 5,538,660 discloses a mixture refrigerant composition comprising HFC-32/HFC-134a/FC-41 and HFC-32/BFC-134a/PFC-218, and U.S. Pat. No. 5,643,492 discloses a mixture refrigerant composition comprising HFC-32/125/134a.

Also, Japanese Patent Laid-Open Publication No. (Hei) 3-172386 discloses a mixture refrigerant composition comprising HFC-32/125/143a, Japanese Patent Laid-Open Publication No. (Hei) 3-170594 discloses a mixture refrigerant composition comprising HFC-23/125/134a, Japanese Patent Laid-Open Publication No. (Hei) 3-170592 discloses a mixture refrigerant composition comprising HFC-32/143a/152a, Japanese Patent Laid-Open Publication No. (Hei) 3-170593 discloses a mixture refrigerant composition comprising HFC-23/125/32, Japanese Patent Laid-Open Publication No. (Hei) 3-170591 discloses a mixture refrigerant composition comprising HFC-23/143a/134a, Japanese Patent Laid-Open Publication No. (Hei) 3-170590 discloses a mixture refrigerant composition comprising HFC-125/134a/32, Japanese Patent Laid-Open Publication No. (Hei) 3-170589 discloses a mixture refrigerant composition comprising HFC-23/143a/152a, Japanese Patent Laid-Open Publication No. (Hei) 3-170588 discloses a mixture refrigerant composition comprising HFC-125/143a/134a, Japanese Patent Laid-Open Publication No. (Hei) 3-170587 discloses a mixture refrigerant composition comprising BFC-32/134a/152a, Japanese Patent Laid-Open Publication No. (Hei) 3-170586 discloses a mixture refrigerant composition comprising HFC-32/143a/134a, Japanese Patent Laid-Open Publication No. (Hei) 3-170585 discloses a mixture refrigerant composition comprising HFC-32/125/134a, Japanese Patent Laid-Open Publication No. (Hei) 3-170584 discloses a mixture refrigerant composition comprising HFC-23/134a/152a, Japanese Patent Laid-Open Publication No. (Hei) 3-170583 discloses a mixture refrigerant composition comprising HFC-125/143a/32, Japanese Patent Laid-Open Publication No. (Hei) 4-222893 discloses a mixture refrigerant composition comprising HFC-32/125, Japanese Patent Laid-Open Publication No. (Hei) 4-154887 discloses a mixture refrigerant composition comprising HFC-134/152a, Japanese Patent Laid-Open Publication No. (Hei) 5-117645 discloses a mixture refrigerant composition comprising HFC-23/134a/propane, Japanese Patent Laid-Open Publication No. (Hei) 5-117643 discloses a mixture refrigerant composition comprising HFC-125/134a/propane, Japanese Patent Laid-Open Publication No. (Hei) 6-65561 discloses a mixture refrigerant composition comprising HFC-23/152a/PFC-218, Japanese Patent Laid-Open Publication No. (Hei) 6-128872 discloses a mixture refrigerant composition comprising HFC-32/PFC-218, Japanese Patent Laid-Open Publication No. (Hei) 6-220433 discloses a mixture refrigerant composition comprising HFC-32/125/RC-318, Japanese Patent Laid-Open Publication No. (Hei) 7-173462 discloses a mixture refrigerant composition comprising HFC-143a/125/134a/heptane, Japanese Patent Laid-Open Publication No. (Hei) 8-176537 discloses a mixture refrigerant composition comprising PFC-21 8/RC-270/HFC- 1 52a, Japanese Patent Laid-Open Publication No. (Hei) 8-151569 discloses a mixture refrigerant composition comprising propane/RC-270/HFC-134a, Japanese Patent Laid-Open Publication No. (Hei) 8-127767 discloses a mixture refrigerant composition comprising HFC-32/134a/RC-318, Japanese Patent Laid-Open Publication No. (Hei) 9-25480 discloses a mixture refrigerant composition comprising HFC-32/143a/125/isobutane, Japanese Patent Laid-Open Publication No. (Hei) 9-59611 discloses a mixture refrigerant composition comprising HFC-134a/isobutane, Japanese Patent Laid-Open Publication No. (Hei) 9-208941 discloses a mixture refrigerant composition comprising HFC-32/152a/125/RC-270, and Japanese Patent Laid-Open Publication No. (Hei) 9-221664 discloses a mixture refrigerant composition comprising HFC-125/143a/134a/RC-270.

Also, Korean Patent Publication No. 93-10514 (Patent Application No. 90-19594) discloses mixture refrigerant compositions comprising HFC-23/32/152a, HFC-23/125/152a, HFC-32/143a/152a, UFC-125/143a/152a, HFC-32/125/125a, HFC-23/143a/152a and HFC-23/125/152a, respectively. Korean Patent Publication No. 93-10515 (Patent Application No. 90-19596) discloses mixture refrigerant compositions comprising HFC-23/32/134, BFC-23/32/134a, HFC-32/125/134a, HFC-23/125/134, HFC-32/125/134, HFC-23/143a/134a, HFC-32/125/134a, HFC-125/143a/134a and HFC-125/143a/134, respectively. Korean Patent Laid-Open Publication No. 96-4485 (Patent Application No. 95-21221) discloses a mixture refrigerant composition comprising HFC-32/23/134a, Korean Patent Laid-Open Publication No. 95-704438 (Patent Application No. 95-701865) discloses a mixture refrigerant composition comprising HFC-32/125/143a, Korean Patent Laid-Open Publication No. 96-701168 (Patent Application No. 95-704038) discloses a mixture refrigerant composition comprising HFC-227ea/HFC-152a, and Korean Patent Laid-Open Publication No. 97-704853 (Patent Application No. 97-700436) discloses a mixture refrigerant composition comprising HFC-134a/HCFC-124/butane.

SUMMARY OF THE INVENTION

The object of the present invention is to provide novel refrigerant mixtures that do not cause destruction of the ozone layer and can thus be used as a substitute for HCFC-22.

The present invention relates to novel refrigerant mixtures that can be used as a substitute for HCFC-22. Specifically, the present invention is directed to refrigerant mixtures wherein any one of the compounds RC-270, HFC-152a, HFC-227ea, HFC-245cb, RC-318, HFC-236ea, HFE-134, HFE-245, R-601 and R-601a is additionally mixed with HFC-32, HFC-125 and HFC-134a.

The refrigerant mixtures of the invention produce the same working effects as HCFC-22 without the risk of causing destruction to the ozone layer, and can therefore be used as an alternative refrigerant for HCFC-22.

DETAILED DESCRIPTION OF THE INVENTION

The present invention provides novel refrigerant mixtures as a substitute for chlorodifluoromethane ($CHClF_2$, hereinafter referred to as HCFC-22).

More specifically, the invention is directed to refrigerant mixtures that comprise:

difluoromethane ($CH_2F_2$, hereinafter referred to as HFC-32) as the first component;

pentafluoroethane ($CIJF_2CF_3$, hereinafter referred to as HFC-125) as the second component;

1,1,1,2-tetrafluoroethane ($CH_2FCF_3$, hereinafter referred to as HFC- 134a) as the third component; and any one of cyclopropane ($C_3H_6$, hereinafter referred to as RC-270), 1,1-difluoroethane ($CH_3CHF_2$, hereinafter referred to as HFC-152a), 1,1,1,2,3,3,3-heptafluoropropane ($CF_3CHFCF_3$, hereinafter referred to as HFC-227ea), 1,1,1,2,2-pentafluoropropane ($CH_3CF_2CF_3$, hereinafter referred to as HFC-245cb), octafluorocyclobutane ($C_4F_8$, hereinafter referred to as RC-318), 1,1,1,2,3,3-hexafluoropropane ($CHF_2CHFCF_3$, hereinafter referred to as HFC-236ea), bis(difluoromethyl)ether ($CHF_2OCHF_2$, hereinafter referred to as HFE-134), pentafluoroethylmethylether ($CF_3CF_2OCH_3$, hereinafter referred to as HFE-245), n-pentane ($C_5H_{12}$, hereinafter referred to as R-601) and isopentane (($CH_3)_2CHCH_2CH_3$, hereinafter referred to as R-601a) as the fourth component.

The refrigerant mixtures according to the present invention can produce similar effects to that of HCFC-22. The advantage of said mixtures is that it will not cause destruction to the ozone layer so that it can be used as a refrigerant even if use of HCFC-22 is restricted. Furthermore, because either such materials are already being produced or studies for the production thereof are actively in progress, these materials can be effectively used by means of the present invention.

The present inventors applied said refrigerant mixture to a refrigeration system comprising a compressor, a condenser, an expansion valve and an evaporator and studied the coefficient of performance (COP), the volumetric capacity of refrigerant (VC), pressure in compressor and evaporator. The novel refrigerant mixtures of the present invention show a performance level nearly equal to that of HFC-407C or HFC-410 and, therefore, they can be used as substitutes for HCFC-22.

The composition of refrigerant mixtures according to the present invention is described below.

In the mixture of HFC-32, HFC-125, HFC-134a and RC-270, the content of HFC-32 is 20 to 70% by weight, preferably 30 to 60% by weight; the content of HFC-125 is not more than 50% by weight, preferably not more than 40% by weight; the content of HFC-134a is 5 to 50% by weight, preferably 10 to 40% by weight; and the content of RC-270 is not more than 30% by weight, preferably not more than 20% by weight.

In the mixture of HFC-32, HFC-125, HFC-134a and HFC-152a, the content of HFC-32 is 25 to 90% by weight, preferably 35 to 80% by weight; the content of HFC-125 is not more than 40% by weight, preferably not more than 30% by weight; the content of HFC-134a is not more than 50% by weight, preferably not more than 40% by weight; and the content of HFC-152a is not more than 45% by weight, preferably not more than 35% by weight.

In the mixture of HFC-32, HFC-125, HFC-134a and HFC-227ea, the content of HFC-32 is 20 to 90% by weight, preferably 30 to 85% by weight; the content of HFC-125 is not more than 60% by weight, preferably not more than 50% by weight; the content of HFC-134a is not more than 60% by weight, preferably not more than 50% by weight; and the content of HFC-227ea is not more than 50% by weight, preferably not more than 40% by weight.

In the mixture of HFC-32, HFC-125, HFC-134a and HFC-245cb, the content of HFC-32 is 25 to 90% by weight, preferably 35 to 85% by weight; the content of HFC-125 is not more than 55% by weight, preferably not more than 45% by weight; the content of HFC-134a is not more than 55% by weight, preferably not more than 45% by weight; and the content of HFC-245cb is not more than 50% by weight, preferably not more than 40% by weight.

In the mixture of HFC-32, HFC-125, BHFC-134a and HFC-318, the content of HFC-32 is 25 to 95% by weight, preferably 35 to 90% by weight; the content of HFC-125 is not more than 45% by weight, preferably not more than 35% by weight; the content of HFC-134a is 5 to 40% by weight, preferably 5 to 30% by weight; and the content of HFC-318 is not more than 35% by weight, preferably not more than 25% by weight.

In the mixture of HFC-32, HFC-125, HFC-134a and HFC-236ea, the content of HFC-32 is 30 to 85% by weight, preferably 40 to 75% by weight; the content of HFC-125 is not more than 45% by weight, preferably not more than 35% by weight; the content of HFC-134a is not more than 50% by weight, preferably not more than 40% by weight; and the content of HFC-236ea is not more than 30% by weight, preferably not more than 20% by weight.

In the mixture of HFC-32, HFC-125, HFC-134a and HFE-134, the content of HFC-32 is 30 to 90% by weight, preferably 40 to 80% by weight; the content of HFC-125 is not more than 45% by weight, preferably not more than 35% by weight; the content of IHFC-134a is not more than 50% by weight, preferably not more than 43% by weight; and the content of HFE-134 is not more than 15% by weight, preferably not more than 10% by weight.

In the mixture of HFC-32, HFC-125, HFC-134a and HFE-245, the content of HFC-32 is 30 to 90% by weight, preferably 40 to 80% by weight; the content of HFC-125 is not more than 45% by weight, preferably not more than 38% by weight; the content of HFC-134a is not more than 45% by weight, preferably not more than 35% by weight; and the content of HFE-245 is not more than 15% by weight, preferably not more than 10% by weight.

In the mixture of HFC-32, HFC-125, HFC-134a and R-601, the content of HFC-32 is 25 to 95% by weight, preferably 35 to 90% by weight; the content of HFC-125 is not more than 55% by weight, preferably not more than 45% by weight; the content of HFC-134a is not more than 45% by weight, preferably not more than 38% by weight; and the content of R-601 is not more than 10% by weight, preferably not more than 5% by weight.

In the mixture of HFC-32, HFC-125, HFC-134a and R-601a, the content of HFC-32 is 30 to 90% by weight, preferably 40 to 80% by weight; the content of HFC-125 is not more than 45% by weight, preferably not more than 35% by weight; the content of HFC-134a is not more than 45% by weight, preferably not more than 35% by weight; and the content of R-601 a is not more than 10% by weight, preferably not more than 6% by weight.

DESCRIPTION OF THE PREFERRED EMBODIMENTS

The present invention is further described by the following examples but should not be construed as being limited by them.

Performance Evaluation of the Mixture Refrigerant

The evaluation parameters that were used to evaluate the performance of the refrigerant mixtures in a refrigeration system comprising a compressor, a condenser, an expansion valve and an evaporator are as follows:

Refrigeration capacity: 2 kW,

Overall heat transfer coefficient in evaporator (UA): 0.20 kW/K,

Overall heat transfer coefficient in condenser (UA): 0.24 kW/K,

Degree of subcooling in condenser: 5° C.

Degree of superheating in evaporator: 5° C.

Compressor efficiency: 0.8

Temperature of secondary fluid in compressor inlet: 25° C.

Temperature of secondary fluid in compressor outlet: 35° C.

Temperature of secondary fluid in evaporator inlet: 15° C.

Temperature of secondary fluid in evaporator outlet: 5° C.

Under the same conditions as given above, the refrigerant mixtures of the invention were compared with HCFC-22, HFC-407C and HFC-410A in view of the major parameters of the refrigerant performance evaluation, the coefficient of performance (COP), the volumetric capacity of refrigerant VC), evaporator pressure ($P_L$) and condenser pressure ($P_H$).

COMPARATIVE EXAMPLES 1–3

A comparison of the results of the performance evaluations of the HCFC-22, HFC-407C and HFC-410A with the performance evaluations of the refrigerant mixtures according to the invention is as follows:

TABLE 1

The Performance Evaluation of the HCFC-22, HFC-407C and HFC-410A

| Refrigerant Type | HCFC-22 (wt %) | HFC-32 (wt %) | HFC-125 (wt %) | HFC-134a (wt %) | COP | VC (kJ/m³) | $P_L$ (kPa) | $P_H$ (kPa) |
|---|---|---|---|---|---|---|---|---|
| Comparative Ex. 1 | 100 | — | — | — | 5.45 | 3338 | 455 | 1254 |
| Comparative Ex. 2 | — | 23 | 25 | 52 | 4.98 | 3412 | 460 | 1445 |
| Comparative Ex. 3 | — | 50 | 50 | — | 5.31 | 5117 | 730 | 1993 |

In Table 1, HFC-407C shows a slightly lower COP than HCFC-22, but its VC and pressure are nearly the same to HCFC-22. HFC-410A shows a similar COP, a superior VC and higher pressure when compared with HCFC-22. Because a refrigerant is acceptable for use as an alternative refrigerant for HCFC-22 when the performance of said refrigerant is within the above range, the performance of the refrigerant mixtures according to the present invention was compared with the above results.

EXAMPLE 1

The results of the performance evaluation of the HFC-32/HFC-125/HFC-134a/RC-270 mixtures are as follows:

The results of the performance evaluation of refrigerant mixtures containing HFC-32/HFC-125/HFC-134a/RC-270 with altered composition ratios are shown in Table 2 below. The performance of each item showed a range that is between that of HFC-407C and HFC-410A, indicating that they can be used as alternative refrigerants to HCFC-22.

TABLE 2

The Performance Evaluation of the HFC-32/HFC-125/HFC-134a/RC-270 Mixtures

| | HFC-32 (wt %) | HFC-125 (wt %) | HFC-134a (wt %) | RC-270 (wt %) | COP | VC (kJ/m³) | $P_L$ (kPa) | $P_H$ (kPa) |
|---|---|---|---|---|---|---|---|---|
| Comp.1 | 40 | 30 | 20 | 10 | 5.11 | 4669 | 681 | 1894 |
| Comp.2 | 30 | 20 | 30 | 20 | 5.02 | 4300 | 634 | 1780 |
| Comp.3 | 45 | 40 | 10 | 5 | 5.17 | 4911 | 711 | 1965 |
| Comp.4 | 50 | 10 | 40 | 0 | 5.21 | 4164 | 557 | 1640 |
| Comp.5 | 60 | 0 | 35 | 5 | 5.18 | 4597 | 632 | 1804 |
| Comp.6 | 35 | 25 | 25 | 15 | 5.05 | 4495 | 661 | 1848 |
| Comp.7 | 50 | 20 | 22 | 8 | 5.15 | 4787 | 685 | 1908 |

EXAMPLE 2

The results of the performance evaluation of the HFC-32/HFC-125/HFC-134a/HFC-152a mixtures are as follows:

The results of the performance evaluation of refrigerant mixtures containing HFC-32/HFC-125/HFC-134a/HFC-152a with altered composition ratios are shown in Table 3 below. The performance of each item showed a range that is between that of HFC-407C and HFC-410A, indicating that they can be used as alternative refrigerants to HCFC-22.

TABLE 3

The Performance Evaluation of the HFC-32/HFC-125/HFC-134a/HFC-152a Mixtures

| | HFC-32 (wt %) | HFC-125 (wt %) | HFC-134a (wt %) | HFC-152a (wt %) | COP | VC (kJ/$m^3$) | $P_L$ (kPa) | $P_H$ (kPa) |
|---|---|---|---|---|---|---|---|---|
| Comp.1 | 40 | 30 | 20 | 10 | 5.16 | 4096 | 557 | 1643 |
| Comp.2 | 70 | 15 | 10 | 5 | 5.37 | 4867 | 661 | 1833 |
| Comp.3 | 80 | 0 | 18 | 2 | 5.38 | 4877 | 656 | 1819 |
| Comp.4 | 75 | 20 | 0 | 5 | 5.43 | 5133 | 704 | 1909 |
| Comp.5 | 60 | 5 | 20 | 15 | 5.21 | 4207 | 558 | 1642 |
| Comp.6 | 50 | 10 | 40 | 0 | 5.21 | 4164 | 556 | 1640 |
| Comp.7 | 50 | 25 | 5 | 20 | 5.18 | 4187 | 564 | 1654 |
| Comp.8 | 45 | 10 | 15 | 30 | 5.16 | 3683 | 481 | 1463 |
| Comp.9 | 35 | 20 | 10 | 35 | 5.10 | 3473 | 456 | 1407 |

EXAMPLE 3

The results of the performance evaluation of the HFC-32/HFC-125/HFC-134a/HFC-227ea mixtures are as follows:

The results of the performance evaluation of refrigerant mixtures containing HFC-32/HFC-125/HFC-134a/HFC-227ea with altered composition ratios are shown in Table 4 below. The performance of each item showed a range that is between that of HFC-407C and HFC-410A, indicating that they can be used as alternative refrigerants to HCFC-22.

TABLE 4

The Performance Evaluation of the HFC-32/HFC-125/HFC-134a/HFC-227ea Mixtures

| | HFC-32 (wt %) | HFC-125 (wt %) | HFC-134a (wt %) | HFC-227ea (wt %) | COP | VC (kJ/$m^3$) | $P_L$ (kPa) | $P_H$ (kPa) |
|---|---|---|---|---|---|---|---|---|
| Comp.1 | 40 | 30 | 20 | 10 | 5.13 | 4325 | 601 | 1756 |
| Comp.2 | 70 | 15 | 10 | 5 | 5.42 | 5065 | 695 | 1899 |
| Comp.3 | 80 | 0 | 18 | 2 | 5.41 | 4955 | 669 | 1841 |
| Comp.4 | 85 | 5 | 5 | 5 | 5.48 | 5297 | 725 | 1942 |
| Comp.5 | 60 | 2 | 30 | 8 | 5.27 | 4457 | 599 | 1726 |
| Comp.6 | 50 | 10 | 40 | 0 | 5.21 | 4164 | 556 | 1640 |
| Comp.7 | 40 | 40 | 0 | 20 | 5.10 | 4682 | 675 | 1924 |
| Comp.8 | 45 | 50 | 2 | 3 | 5.19 | 4894 | 705 | 1962 |
| Comp.9 | 35 | 13 | 50 | 2 | 5.09 | 3692 | 491 | 1510 |
| Comp.10 | 45 | 20 | 5 | 30 | 5.13 | 4543 | 640 | 1849 |
| Comp.11 | 43 | 2 | 15 | 40 | 4.99 | 4091 | 565 | 1722 |
| Comp.12 | 30 | 10 | 50 | 10 | 5.03 | 3420 | 454 | 1456 |

EXAMPLE 4

The results of the performance evaluation of the HFC-32/HFC-125/HFC-134a/HFC-245cb mixtures are as follows:

The results of the performance evaluation of refrigerant mixtures containing HFC-32/HFC-125/HFC-134a/HFC-245cb with altered composition ratios are shown in Table 5 below. The performance of each item showed a range that is between that of HFC-407C and HFC-410A, indicating that they can be used as alternative refrigerants to HCFC-22.

TABLE 5

The Performance Evaluation of the HFC-32/HFC-125/HFC-134a/HFC-245cb Mixtures

| | HFC-32 (wt %) | HFC-125 (wt %) | HFC-134a (wt %) | HFC-245cb (wt %) | COP | VC (kJ/$m^3$) | $P_L$ (kPa) | $P_H$ (kPa) |
|---|---|---|---|---|---|---|---|---|
| Comp.1 | 40 | 30 | 20 | 10 | 5.11 | 4220 | 584 | 1722 |
| Comp.2 | 50 | 10 | 10 | 30 | 5.08 | 4204 | 576 | 1716 |
| Comp.3 | 60 | 20 | 0 | 20 | 5.31 | 4851 | 673 | 1878 |
| Comp.4 | 70 | 0 | 15 | 15 | 5.34 | 4716 | 638 | 1795 |
| Comp.5 | 85 | 5 | 5 | 5 | 5.47 | 5233 | 715 | 1924 |
| Comp.6 | 80 | 15 | 5 | 0 | 5.46 | 5269 | 723 | 1943 |
| Comp.7 | 45 | 5 | 40 | 10 | 5.14 | 3906 | 520 | 1571 |
| Comp.8 | 55 | 13 | 30 | 2 | 5.25 | 4412 | 595 | 1719 |
| Comp.9 | 35 | 35 | 20 | 10 | 5.05 | 4110 | 572 | 1703 |
| Comp.10 | 50 | 3 | 7 | 40 | 5.02 | 4048 | 552 | 1679 |
| Comp.11 | 50 | 40 | 2 | 8 | 5.26 | 4891 | 691 | 1921 |
| Comp.12 | 45 | 45 | 8 | 2 | 5.22 | 4781 | 676 | 1897 |
| Comp.13 | 45 | 5 | 45 | 5 | 5.16 | 3900 | 517 | 1561 |

EXAMPLE 5

The results of the performance evaluation of the HFC-32/HFC-125/HFC-134a/RC-318 mixtures are as follows:

The results of the performance evaluation of refrigerant mixtures containing HFC-32/HFC-125/HFC-134a/RC-318 with altered composition ratios are shown in Table 6 below. The performance of each item showed a range that is between that of HFC-407C and HFC-410A, indicating that they can be used as alternative refrigerants to HCFC-22.

TABLE 6

The Performance Evaluation of the HFC-32/HFC-125/HFC-134a/RC-318 Mixtures

| | HFC-32 (wt %) | HFC-125 (wt %) | HFC-134a (wt %) | RC-318 (wt %) | COP | VC (kJ/$m^3$) | $P_L$ (kPa) | $P_H$ (kPa) |
|---|---|---|---|---|---|---|---|---|
| Comp.1 | 40 | 30 | 20 | 10 | 5.12 | 4517 | 639 | 1842 |
| Comp.2 | 35 | 10 | 30 | 25 | 4.99 | 4196 | 593 | 1773 |
| Comp.3 | 60 | 20 | 15 | 5 | 5.30 | 4943 | 684 | 1907 |
| Comp.4 | 70 | 0 | 28 | 2 | 5.30 | 4691 | 631 | 1789 |
| Comp.5 | 90 | 5 | 5 | 0 | 5.49 | 5314 | 725 | 1936 |
| Comp.6 | 50 | 15 | 15 | 20 | 5.21 | 4959 | 707 | 1977 |
| Comp.7 | 40 | 35 | 10 | 15 | 5.13 | 4798 | 696 | 1961 |
| Comp.8 | 80 | 7 | 10 | 3 | 5.41 | 5220 | 715 | 1944 |

EXAMPLE 6

The results of the performance evaluation of the HFC-32/HFC-125/HFC-134a/HFC-236ea mixtures are as follows:

The results of the performance evaluation of refrigerant mixtures containing HFC-32/HFC-125/HFC-134a/HFC-236ea with altered composition ratios are shown in Table 7 below. The performance of each item showed a range that is between that of HFC-407C and HFC-410A, indicating that they can be used as alternative refrigerants to HCFC-22.

TABLE 7

The performance Evaluation of the
HFC-32/HFC-125/HFC-134a/HFC-236ea Mixtures

| | HFC-32 (wt %) | HFC-125 (wt %) | HFC-134a (wt %) | HFC-236ea (wt %) | COP | VC (kJ/m$^3$) | P$_L$ (kPa) | P$_H$ (kPa) |
|---|---|---|---|---|---|---|---|---|
| Comp.1 | 40 | 30 | 20 | 10 | 4.99 | 4100 | 564 | 1712 |
| Comp.2 | 60 | 10 | 15 | 15 | 5.11 | 4460 | 606 | 1784 |
| Comp.3 | 70 | 0 | 10 | 20 | 5.08 | 4569 | 622 | 1826 |
| Comp.4 | 75 | 5 | 0 | 20 | 5.20 | 4902 | 675 | 1910 |
| Comp.5 | 45 | 15 | 40 | 0 | 5.18 | 4088 | 548 | 1628 |
| Comp.6 | 45 | 20 | 30 | 5 | 5.14 | 4168 | 565 | 1678 |
| Comp.7 | 50 | 35 | 7 | 8 | 5.20 | 4703 | 656 | 1867 |

EXAMPLE 7

The results of the performance evaluation of the HFC-32/HFC-125/HFC-134a/HFC-134 mixtures are as follows:

The results of the performance evaluation of refrigerant mixtures containing HFC-32/HFC-125/HFC-134a/HFC-134 with altered composition ratios are shown in Table 8 below. The performance of each item showed a range that is between that of HFC-407C and HFC-410A, indicating that they can be used as alternative refrigerants to HCFC-22.

TABLE 8

The Performance Evaluation of the
HFC-32/HFC-125/HFC-134a/HFE-134 Mixtures

| | HFC-32 (wt %) | HFC-125 (wt %) | HFC-134a (wt %) | HFE-134 (wt %) | COP | VC (kJ/m$^3$) | P$_L$ (kPa) | P$_H$ (kPa) |
|---|---|---|---|---|---|---|---|---|
| Comp.1 | 80 | 5 | 5 | 10 | 4.98 | 4519 | 607 | 1822 |
| Comp.2 | 70 | 10 | 12 | 8 | 5.03 | 4425 | 593 | 1779 |
| Comp.3 | 60 | 35 | 0 | 5 | 5.17 | 4817 | 667 | 1904 |
| Comp.4 | 50 | 20 | 25 | 5 | 5.02 | 4117 | 553 | 1686 |
| Comp.5 | 55 | 0 | 43 | 2 | 5.15 | 4041 | 532 | 1603 |
| Comp.6 | 40 | 25 | 35 | 0 | 5.14 | 4106 | 558 | 1655 |
| Comp.7 | 45 | 32 | 20 | 3 | 5.07 | 4290 | 588 | 1748 |

EXAMPLE 8

The results of the performance evaluation of the HFC-32/HFC-125/HFC-134a/HFC-245 mixtures are as follows:

The results of the performance evaluation of refrigerant mixtures containing HFC-32/HFC-125/HFC-134a/HFC-245 with altered composition ratios are shown in Table 9 below. The performance of each item showed a range that is between that of HFC-407C and HFC-410A, indicating that they can be used as alternative refrigerants to HCFC-22.

TABLE 9

The Performance Evaluation of the
HFC-32/HFC-125/HFC-134a/HFE-245 Mixtures

| | HFC-32 (wt %) | HFC-125 (wt %) | HFC-134a (wt %) | HFE-245 (wt %) | COP | VC (kJ/m$^3$) | P$_L$ (kPa) | P$_H$ (kPa) |
|---|---|---|---|---|---|---|---|---|
| Comp.1 | 80 | 5 | 5 | 10 | 5.10 | 4784 | 656 | 1889 |
| Comp.2 | 80 | 12 | 0 | 8 | 5.36 | 5164 | 711 | 1943 |
| Comp.3 | 70 | 10 | 20 | 0 | 5.38 | 4837 | 655 | 1821 |

TABLE 9-continued

The Performance Evaluation of the
HFC-32/HFC-125/HFC-134a/HFE-245 Mixtures

| | HFC-32 (wt %) | HFC-125 (wt %) | HFC-134a (wt %) | HFE-245 (wt %) | COP | VC (kJ/m$^3$) | P$_L$ (kPa) | P$_H$ (kPa) |
|---|---|---|---|---|---|---|---|---|
| Comp.4 | 60 | 0 | 35 | 5 | 5.18 | 4250 | 565 | 1673 |
| Comp.5 | 50 | 20 | 25 | 5 | 5.10 | 4275 | 581 | 1726 |
| Comp.6 | 45 | 38 | 15 | 2 | 5.19 | 4569 | 636 | 1821 |
| Comp.7 | 40 | 30 | 27 | 3 | 5.08 | 4143 | 568 | 1694 |
| Comp.8 | 62 | 25 | 10 | 3 | 5.32 | 4919 | 678 | 1886 |

EXAMPLE 9

The results of the performance evaluation of the HFC-32/HFC-125/HFC-134a/R-601 mixtures are as follows:

The results of the performance evaluation of refrigerant mixtures containing 1FC-32/HFC-125/HFC-134a/R-601 with altered composition ratios are shown in Table 10 below. The performance of each item showed a range that is between that of HFC-407C and HFC-410A, indicating that they can be used as alternative refrigerants to HCFC-22.

TABLE 10

The Performance Evaluation of the
HFC-32/HFC-125/HFC-134a/R-601 Mixtures

| | HFC-32 (wt %) | HFC-125 (wt %) | HFC-134a (wt %) | R-601 (wt %) | COP | VC (kJ/m$^3$) | P$_L$ (kPa) | P$_H$ (kPa) |
|---|---|---|---|---|---|---|---|---|
| Comp.1 | 90 | 2 | 3 | 5 | 5.45 | 5295 | 729 | 1956 |
| Comp.2 | 90 | 0 | 5 | 5 | 5.51 | 5314 | 730 | 1941 |
| Comp.3 | 80 | 10 | 6 | 4 | 5.48 | 5215 | 717 | 1927 |
| Comp.4 | 70 | 15 | 12 | 3 | 5.38 | 4973 | 683 | 1881 |
| Comp.5 | 60 | 37 | 0 | 3 | 5.33 | 5093 | 718 | 1963 |
| Comp.6 | 50 | 30 | 17 | 3 | 5.15 | 4414 | 623 | 1801 |
| Comp.7 | 40 | 20 | 38 | 2 | 5.09 | 3951 | 534 | 1613 |
| Comp.8 | 43 | 25 | 30 | 2 | 5.13 | 4172 | 570 | 1685 |
| Comp.9 | 45 | 29 | 25 | 1 | 5.17 | 4369 | 601 | 1749 |
| Comp.10 | 35 | 45 | 20 | 0 | 5.08 | 4336 | 611 | 1782 |

EXAMPLE 10

The results of the performance evaluation of the HFC-32/HFC-125/HFC-134a/R-601a mixtures are as follows:

The results of the performance evaluation of refrigerant mixtures containing HFC-32/HFC-125/HFC-134a/R-601a with altered composition ratios are shown in Table 11 below. The performance of each item showed a range that is between that of HFC-407C and HFC-410A, indicating that they can be used as alternative refrigerants to HCFC-22.

TABLE 11

The Performance Evaluation of the
HFC-32/HFC-125/HFC-134a/R-601a Mixtures

| | HFC-32 (wt %) | HFC-125 (wt %) | HFC-134a (wt %) | R-601a (wt %) | COP | VC (kJ/m$^3$) | P$_L$ (kPa) | P$_H$ (kPa) |
|---|---|---|---|---|---|---|---|---|
| Comp.1 | 80 | 7 | 8 | 5 | 5.49 | 5207 | 718 | 1923 |
| Comp.2 | 70 | 10 | 14 | 6 | 5.08 | 4625 | 640 | 1851 |

TABLE 11-continued

The Performance Evaluation of the
HFC-32/HFC-125/HFC-134a/R-601a Mixtures

| | HFC-32 (wt %) | HFC-125 (wt %) | HFC-134a (wt %) | R-601a (wt %) | COP | VC (kJ/m³) | $P_L$ (kPa) | $P_H$ (kPa) |
|---|---|---|---|---|---|---|---|---|
| Comp.3 | 60 | 0 | 35 | 5 | 5.21 | 4302 | 579 | 1689 |
| Comp.4 | 60 | 35 | 0 | 5 | 5.21 | 4807 | 632 | 1944 |
| Comp.5 | 50 | 20 | 26 | 4 | 5.16 | 4333 | 594 | 1735 |
| Comp.6 | 40 | 27 | 30 | 3 | 5.10 | 4099 | 563 | 1672 |
| Comp.7 | 63 | 15 | 20 | 2 | 5.32 | 4749 | 649 | 1821 |
| Comp.8 | 59 | 30 | 10 | 1 | 5.34 | 4957 | 688 | 1899 |
| Comp.9 | 45 | 25 | 30 | 0 | 5.17 | 4296 | 586 | 1715 |

The refrigerant mixtures of the invention have working effects equal to that of HCFC-22 but does not have the risk of causing destruction to the ozone layer and can therefore be used as alternative refrigerants to HCFC-22.

What is claimed is:

1. A refrigerant mixture comprising:
difluoromethane as the first component;
pentafluoroethane as the second component;
1,1,2-tetrafluoroethane as the third component; and
cyclopropane as the fourth component.

2. The mixture according to claim 1, wherein said mixture comprises 30 to 60% by weight of difluoromethane, not more than 40% by weight of pentafluoroethane, 10 to 40% by weight of 1,1,1,2-tetrafluoroethane, and not more than 20% by weight of cyclopropane.

3. The mixture according to claim 1, wherein said mixture comprises 20 to 70% by weight difluoromethane.

4. The mixture according to claim 1, wherein said mixture comprises 30 to 60% by weight difluoromethane.

5. The mixture according to claim 1, wherein said mixture comprises not more than 50% by weight of pentafluoroethane.

6. The mixture according to claim 1, wherein said mixture comprises not more than 40% by weight of pentafluoroethane.

7. The mixture according to claim 1, wherein said mixture comprises 5 to 50% by weight 1,1,1,2-tetrafluoroethane.

8. The mixture according to claim 1, wherein said mixture comprises 10 to 40% by weight 1,1,1,2-tetrafluoroethane.

9. The mixture according to claim 1, wherein said mixture comprises not more than 30% by weight of cyclopropane.

10. The mixture according to claim 1, wherein said mixture comprises not more than 20% by weight of cyclopropane.

* * * * *